US012714887B2

(12) United States Patent
Millar

(10) Patent No.: US 12,714,887 B2

(45) Date of Patent: Aug. 25, 2026

(54) CRASH BAG

(71) Applicant: Jason Gary Millar, Brampton (CA)

(72) Inventor: Jason Gary Millar, Brampton (CA)

(*) Notice: Subject to any disclaimer, the term of this patent is extended or adjusted under 35 U.S.C. 154(b) by 1339 days.

(21) Appl. No.: 17/448,555

(22) Filed: Sep. 23, 2021

(65) Prior Publication Data

US 2022/0001214 A1 Jan. 6, 2022

Related U.S. Application Data

(62) Division of application No. 15/954,246, filed on Apr. 16, 2018, now Pat. No. 11,260,250.

(51) Int. Cl.
*A62B 1/22* (2006.01)

(52) U.S. Cl.
CPC .................................... *A62B 1/22* (2013.01)

(58) Field of Classification Search
CPC .......... A62B 1/22; A63B 6/02; A63B 2225/62
USPC ........................................................ 182/137
See application file for complete search history.

(56) References Cited

U.S. PATENT DOCUMENTS

| | | | | |
|---|---|---|---|---|
| 2,390,955 A | 12/1945 | McDonnell | | |
| 2,906,366 A | 9/1959 | Mapes | | |
| 3,369,808 A | 2/1968 | Sconce | | |
| 3,391,414 A | 7/1968 | Gordon | | |
| 3,399,407 A | 9/1968 | Olsen | | |
| 3,840,922 A | 10/1974 | Morrison et al. | | |
| 3,851,730 A * | 12/1974 | Scurlock | A62B 1/22 | 182/137 |
| 4,068,739 A | 1/1978 | Gordon et al. | | |
| 6,701,559 B2 * | 3/2004 | Boso | A47C 27/087 | 5/713 |
| 7,107,641 B2 * | 9/2006 | Davis | A61G 7/103 | 5/710 |
| 7,462,142 B1 | 12/2008 | Gordon | | |
| 7,478,448 B2 * | 1/2009 | Boso | A47C 27/087 | 5/713 |
| 8,419,053 B2 * | 4/2013 | Ahn | B60R 21/231 | 280/732 |
| 8,425,338 B2 * | 4/2013 | Gray | A63G 31/12 | 472/134 |

(Continued)

FOREIGN PATENT DOCUMENTS

| | | | |
|---|---|---|---|
| AT | 510362 | A1 | 3/2012 |
| CA | 2921796 | A1 | 3/2015 |

(Continued)

*Primary Examiner* — Daniel P Cahn
*Assistant Examiner* — Shiref M Mekhaeil
(74) *Attorney, Agent, or Firm* — Aird & Berlis LLP

(57) ABSTRACT

In an aspect, an outlet valve for a crash bag is provided, and includes a peripheral wall defining an inlet and outlet. The peripheral wall is flexible and has an inner face that defines a passage. The peripheral wall has an outer face that is in an air chamber. The valve has an axis between the inlet and outlet. The peripheral wall includes panels each having first and second side edges that extend generally axially. The first side edge from each of the panels is joined to a second side edge of an adjacent panel by a seam. At least one of the seams is a slope-change seam such that a slope of the peripheral wall in a transverse plane changes by more at said slope-change seam than along a portion of the peripheral wall extending between the slope-change seam and a subsequent one of the seams.

6 Claims, 16 Drawing Sheets

(56) References Cited

U.S. PATENT DOCUMENTS

| | | | | |
|---|---|---|---|---|
| 2003/0024050 | A1* | 2/2003 | Boso | A47C 27/10 5/713 |
| 2006/0021133 | A1* | 2/2006 | Davis | A61G 7/1028 5/81.1 R |
| 2009/0181827 | A1* | 7/2009 | Hylbert | B63B 34/52 482/29 |
| 2016/0101300 | A1 | 4/2016 | Gray | |
| 2016/0199723 | A1 | 7/2016 | Rasinger | |
| 2019/0314652 | A1* | 10/2019 | Millar | A62B 1/22 |
| 2020/0256074 | A1* | 8/2020 | Ross | E04H 4/0006 |
| 2024/0307728 | A1* | 9/2024 | Schmit | A63B 6/02 |

FOREIGN PATENT DOCUMENTS

| | | | |
|---|---|---|---|
| DE | 2302248 | A1 | 7/1974 |
| EP | 3038721 | B1 | 7/2016 |
| EP | 2845628 | B1 | 5/2017 |
| FR | 2829400 | A1 | 3/2003 |
| WO | 2003022361 | A1 | 3/2003 |
| WO | 2005094944 | A1 | 10/2005 |
| WO | 2009061246 | A1 | 5/2009 |
| WO | 2010112953 | A1 | 10/2010 |
| WO | 2014062074 | A1 | 4/2014 |

* cited by examiner

CRASH BAG

CROSS-REFERENCE TO RELATED APPLICATIONS

This application is a divisional application of U.S. patent application Ser. No. 15/954,246, filed on Apr. 16, 2018, the contents of which is incorporated herein by reference in its entirety.

FIELD

This disclosure relates generally to crash bags, and more particularly to crash bags that are configured to accommodate users of different weights.

BACKGROUND

It is known to provide crash bags that are inflated so as to protect people from injury when dropping from a height. However, current crash bags suffer from a variety of deficiencies. For example, current crash bags have apertures to permit the air in the crash bag to be vented upon impact by the user. But the apertures must be sized appropriately for use with users of different weights. As a result, they can be cumbersome to set up for different users. Additionally, some crash bags are risky to use in the sense that, if they suffer a failure, there is a great risk of injury to the user.

SUMMARY OF THE DISCLOSURE

In one aspect, there is provided a crash bag that includes an impact structure and a first outlet valve. The impact structure has a first bag wall at least partially defining a first bag air chamber that has a first bag air chamber inlet for receiving pressurized air, and has a first bag air chamber operating pressure. The first outlet valve has a first valve inlet in fluid communication with the first bag air chamber and a first valve outlet, and has a first peripheral valve wall that is flexible. The first peripheral valve wall has an inner face that defines a passage through the first outlet valve between the first valve inlet and the first valve outlet. The first peripheral valve wall has an outer face that is in a first valve air chamber having a first valve air chamber operating pressure. In a setup state the first valve air chamber operating pressure is greater than the first bag air chamber operating pressure so as to drive a first length of the inner face of the first peripheral valve wall into engagement with a second length of the inner face of the first peripheral valve wall so as to inhibit air leakage from the first outlet valve. When in the setup state, an impact at a first kinetic energy on the impact structure increases the first bag air chamber operating pressure sufficiently to drive a first portion of the first length of the inner face of the first peripheral valve wall away from the second length of the inner face of the first peripheral valve wall so as to facilitate air leakage through the passage. When in the setup state, an impact at a second kinetic energy on the impact structure that is higher than the first kinetic energy, increases the first bag air chamber operating pressure sufficiently to drive a second portion of the first length of the inner face of the first peripheral valve wall away from the second length of the inner face of the first peripheral valve wall so as to facilitate air leakage through the passage. The second portion of the first length is greater than the first portion of the first length.

In another aspect, there is provided a crash bag that includes an impact structure and an outlet valve. The impact structure has a first bag wall partially defining a first bag air chamber that has a first bag air chamber inlet for receiving pressurized air, and that has a first bag air chamber operating pressure, and a second bag wall partially defining the first bag air chamber and at least partially defining a second bag air chamber that has a second bag air chamber inlet for receiving pressurized air and that has a second bag air chamber operating pressure. The outlet valve positioned for discharging air from the second bag air chamber upon an impact on the impact structure by a user. The second bag air chamber includes a plurality of projections that are adjacent one another and that are fluidically connected. In use, the first bag wall is positioned atop the plurality of projections and extends across the plurality of projections such that the operating pressure in the first bag air chamber is applied to all of the plurality of projections.

In yet another aspect, there is provided a crash bag that includes an impact structure, a safety surround and an apron. The impact structure is inflatable from a first pressurized air source. The safety surround at least partially surrounds an uppermost portion of the impact structure such that a crevice is present therebetween. The apron extends between the impact structure and the safety surround. The apron extends down between about 30% and about 70% of a depth of the crevice.

In yet another aspect, an outlet valve for a crash bag is provided, and includes a first peripheral valve wall defining a first valve inlet air chamber and a first valve outlet. The first peripheral valve wall is flexible and has an inner face that defines a passage through the first outlet valve between the first valve inlet and the first valve outlet. The first peripheral valve wall has an outer face that is in a first valve air chamber having a first valve air chamber operating pressure. The first outlet valve has a first outlet valve axis extending between the first valve inlet and the first valve outlet. The first peripheral valve wall includes a plurality of first peripheral valve wall panels each having a first side edge and a second side edge both of which extend generally axially. The first side edge from each of the plurality of first peripheral valve wall panels is joined to a second side edge of an adjacent one of the first peripheral valve wall panels by a seam. At least one of the seams is a slope-change seam such that a slope of the first peripheral valve wall in a transverse plane changes by more at said at least slope-change seam than along a portion of the first peripheral valve wall extending between the slope-change seam and a subsequent one of the seams.

In yet another aspect, a crash bag is provided and includes an impact structure, a first outlet valve, a safety peripheral structure and a second outlet valve. The impact structure includes a first bag air chamber that has a first bag air chamber inlet for receiving pressurized air, and that has a first bag air chamber operating pressure. The first outlet valve positioned for discharging air from the first bag air chamber upon an impact on the impact structure by a user. The safety peripheral structure includes a second bag air chamber that has a second bag air chamber inlet for receiving pressurized air and that has a second bag air chamber operating pressure. The second outlet valve is positioned for discharging air from the second bag air chamber upon an impact thereon by the user. The safety peripheral structure extends along a periphery of the first bag air chamber. The second bag air chamber is divided into a plurality of peripheral subchambers that are separated from one another by a plurality of dividers. Each of the plurality of dividers has a pass-through aperture. The pass-through aperture on a first divider from the plurality of dividers is spaced sufficiently to be free of any overlap with the pass-through aperture on a second divider from the plurality of dividers that is subsequent to the first divider. The pass-through aperture on the second of the plurality of dividers is spaced sufficiently to be free of any overlap with the pass-through aperture on a third divider from the plurality of dividers, which is subsequent to the second divider.

Other aspects of the present disclosure are also considered to be inventive.

BRIEF DESCRIPTIONS OF THE DRAWINGS

For a better understanding of the embodiments described herein and to show more clearly how they may be carried into effect, reference will now be made, by way of example only, to the accompanying drawings in which.

DETAILED DESCRIPTION

Figure 1A:
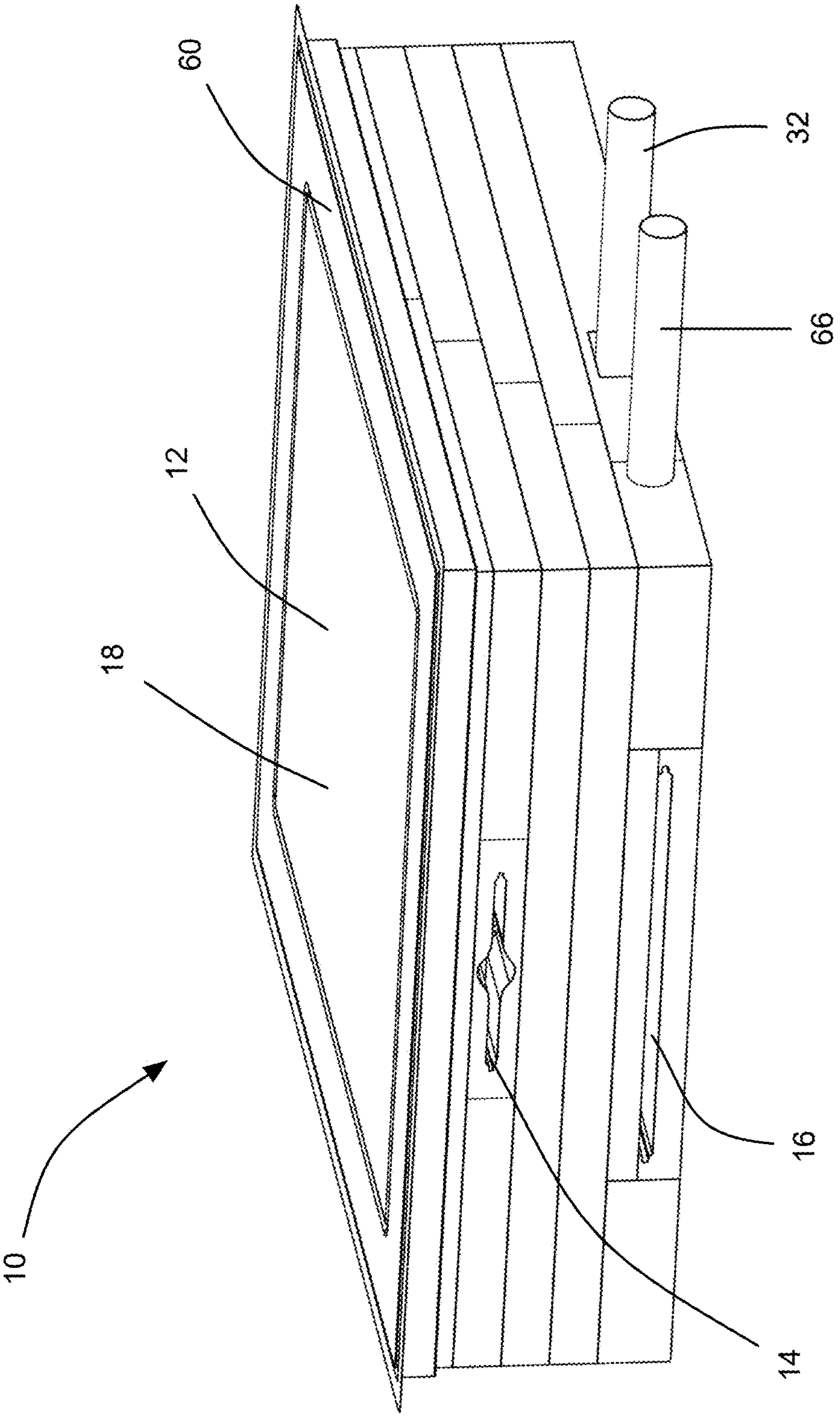
FIG. 1A is a perspective view of a crash bag in accordance with an embodiment of the present disclosure.
Figure 1B:
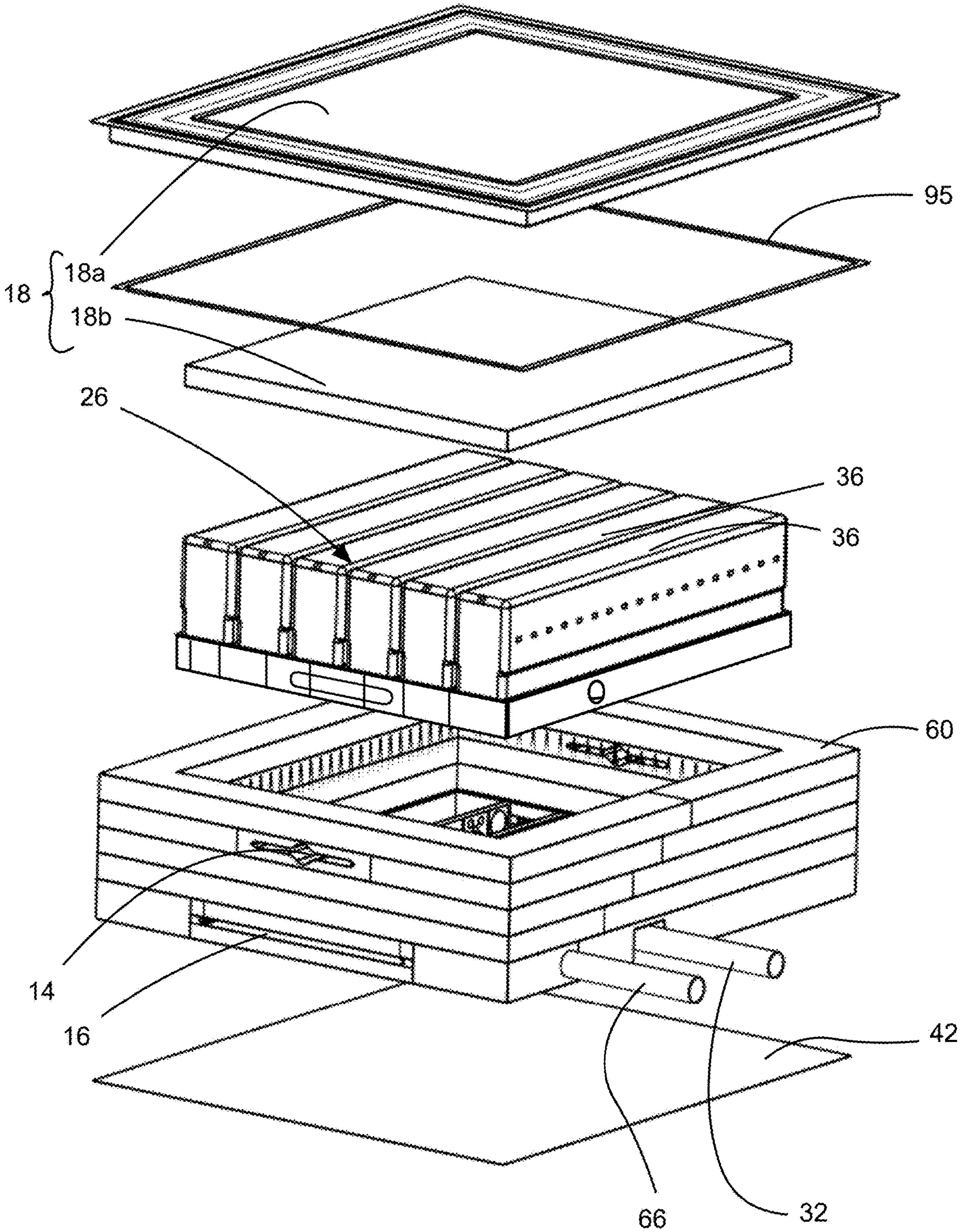
FIG. 1B is a perspective exploded view of the crash bag shown in FIG. 1A.

Reference is made to FIG. 1, which shows a crash bag 10 in accordance with an embodiment of the present disclosure. In some embodiments, the crash bag 10 can automatically adjust the amount of venting of air that occurs upon impact by a user (shown at 11 in FIGS. 2B and 2C). In some embodiments, the crash bag 10 is less vulnerable to failure and as a result, a user 11 is less at risk of injury during use than some crash bags of the prior art. In some embodiments, the crash bag 10 is able to better dissipate the energy of an impact than some crash bags of the prior art so as to reduce the likelihood of injury.

Figure 2A:
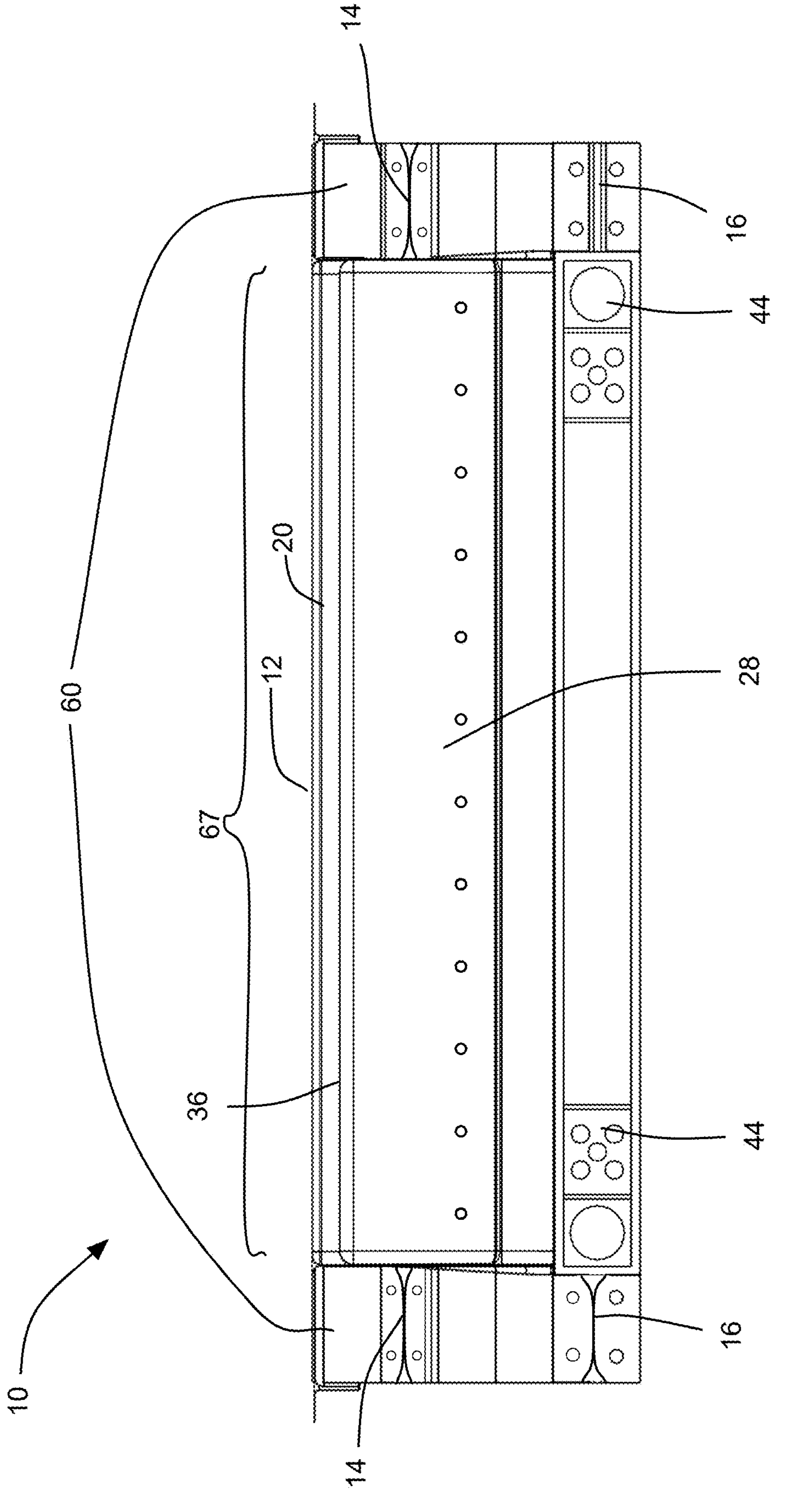
FIG. 2A is a sectional side elevation view of the crash bag shown in FIG. 1, in a setup state.
Figure 2B:
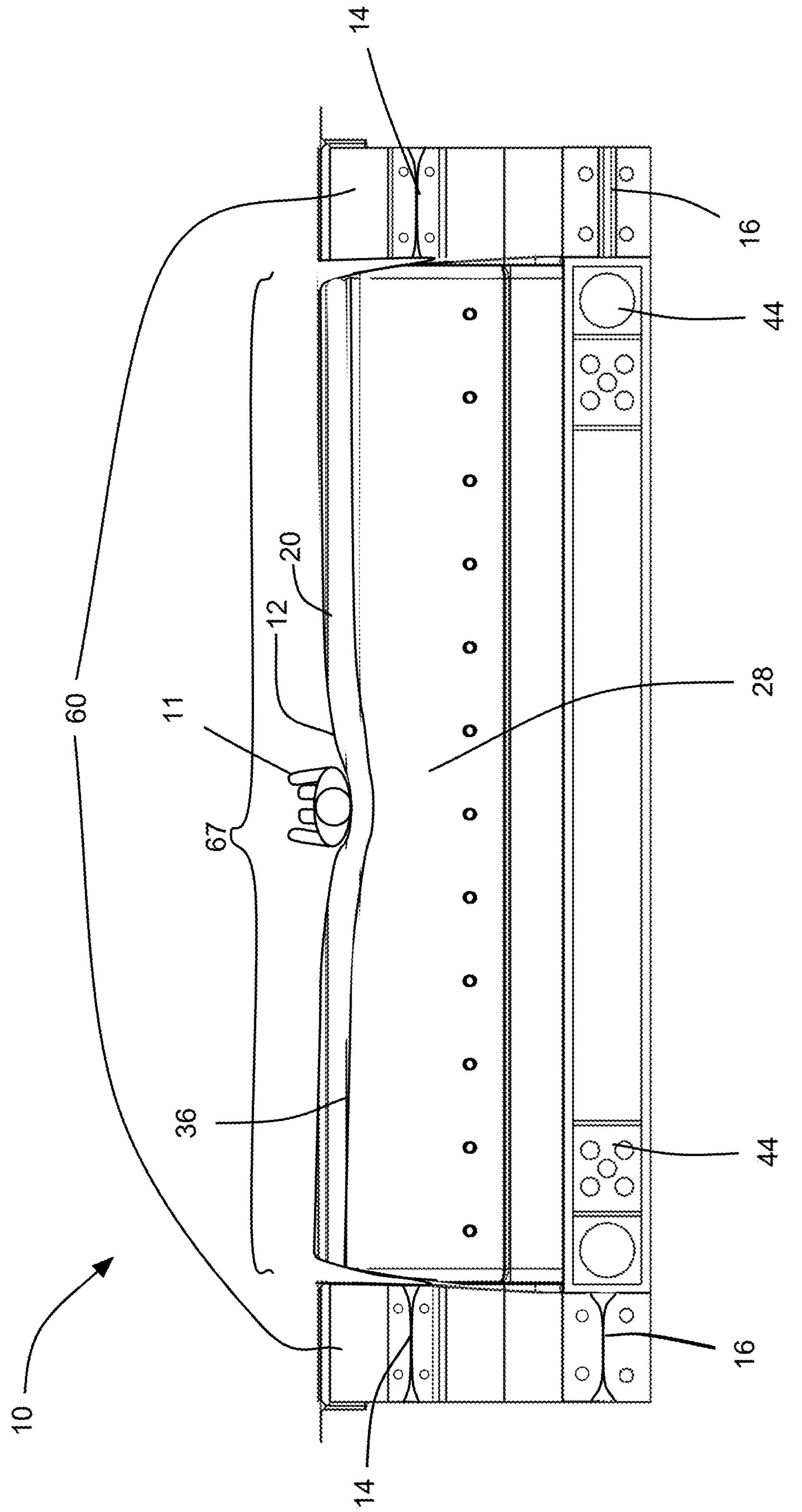
FIG. 2B is a sectional side elevation view of the crash bag shown in FIG. 1, upon impact by a user having a first kinetic energy.
Figure 2C:
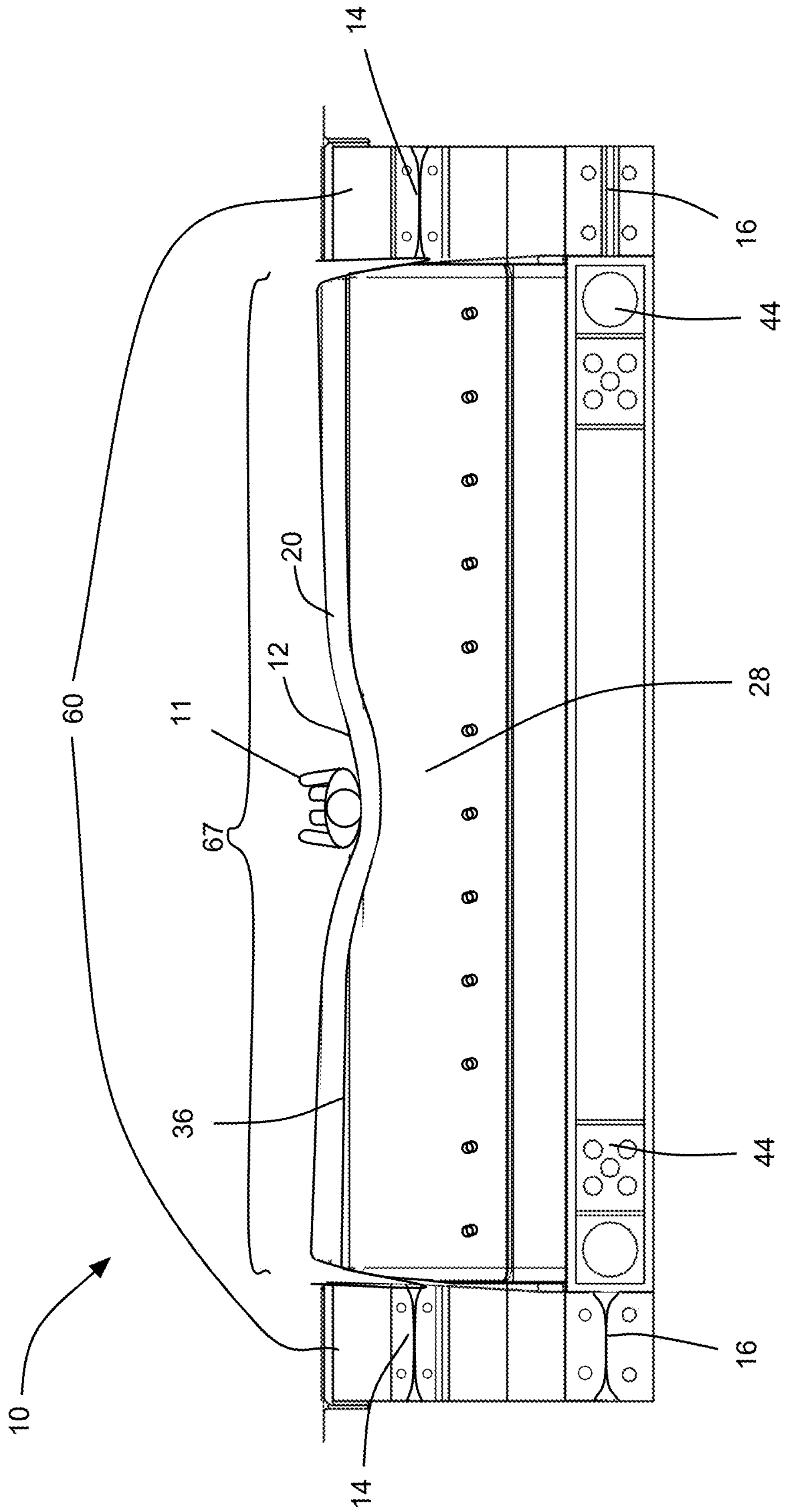
FIG. 2C is a sectional side elevation view of the crash bag shown in FIG. 1, upon impact by the user having a second kinetic energy.

The crash bag 10 includes impact structure 12, which is an inflatable structure, a first outlet valve 14 and a second outlet valve 16. With reference to FIGS. 2A-2C, the impact structure 12 has a first bag wall 18 that partially defines a first bag air chamber 20.

The first bag wall 18 may be a two layer wall, which includes an upper layer, shown at 18*a* (FIG. 1*b*), that is the layer that is directly impacted by the user, and a lower layer 18*b* (FIG. 1*b*) that protects the elements therebeneath from damage resulting from impact. The lower layer may, for example, be made from ripstop nylon. The impact structure 12 further includes a second bag wall 26 that at least partially defines a second bag air chamber 28. The second bag wall 26 also partially defines the first bag air chamber 20. In other words, the second bag wall 26 is a dividing wall between the first and second bag air chambers 20 and 28.

The first and second bag air chambers 20 and 28 have first and second bag air chamber operating pressures PB1 and PB2 (FIG. 7) are both connectable to a first pressurized air source 30 by means of an inlet air conduit 32. The first pressurized air source 30 may be a fan or a blower or any other suitable air pressurizing means. Air passes from the inlet air conduit 32 into the second bag air chamber 28, and passes from the second bag air chamber 28 into the first bag air chamber 20 via grommeted apertures 34 in the second bag wall 26, shown in FIGS. 2A-2C. The inlet air conduit 32 may be considered to be a second bag air chamber inlet. The apertures 34 that pass through the second bag wall 26 may be considered to be a first bag air chamber inlet. It is optionally possible to eliminate the grommeted apertures 34 and to introduce air into the first bag air chamber through small apertures created by the sewing thread where the panels making up the second bag wall 26 are sewn together. In yet another alternative embodiment, it is possible to provide the first bag air chamber 20 with its own direct connection to the inlet air conduit 32 so that air is directed from the first pressurized air source 30 in parallel to the first and second bag air chambers 20 and 28 instead of feeding air into the second bag air chamber 28 and from there into the first bag air chamber 20. In yet another embodiment it is possible for the first bag air chamber 20 and the second bag air chamber 28 to each have inlets that are connected to separate pressurized air sources instead of being connected to the same pressurized air source. Based on the many possible arrangements described above, it may be said that the first bag air chamber 20 has a first bag air chamber inlet (shown as the apertures 34) for receiving pressurized air, and the second bag air chamber 28 has a second bag air chamber inlet (shown as the inlet air conduit 32) for receiving pressurized air.

Figure 3:
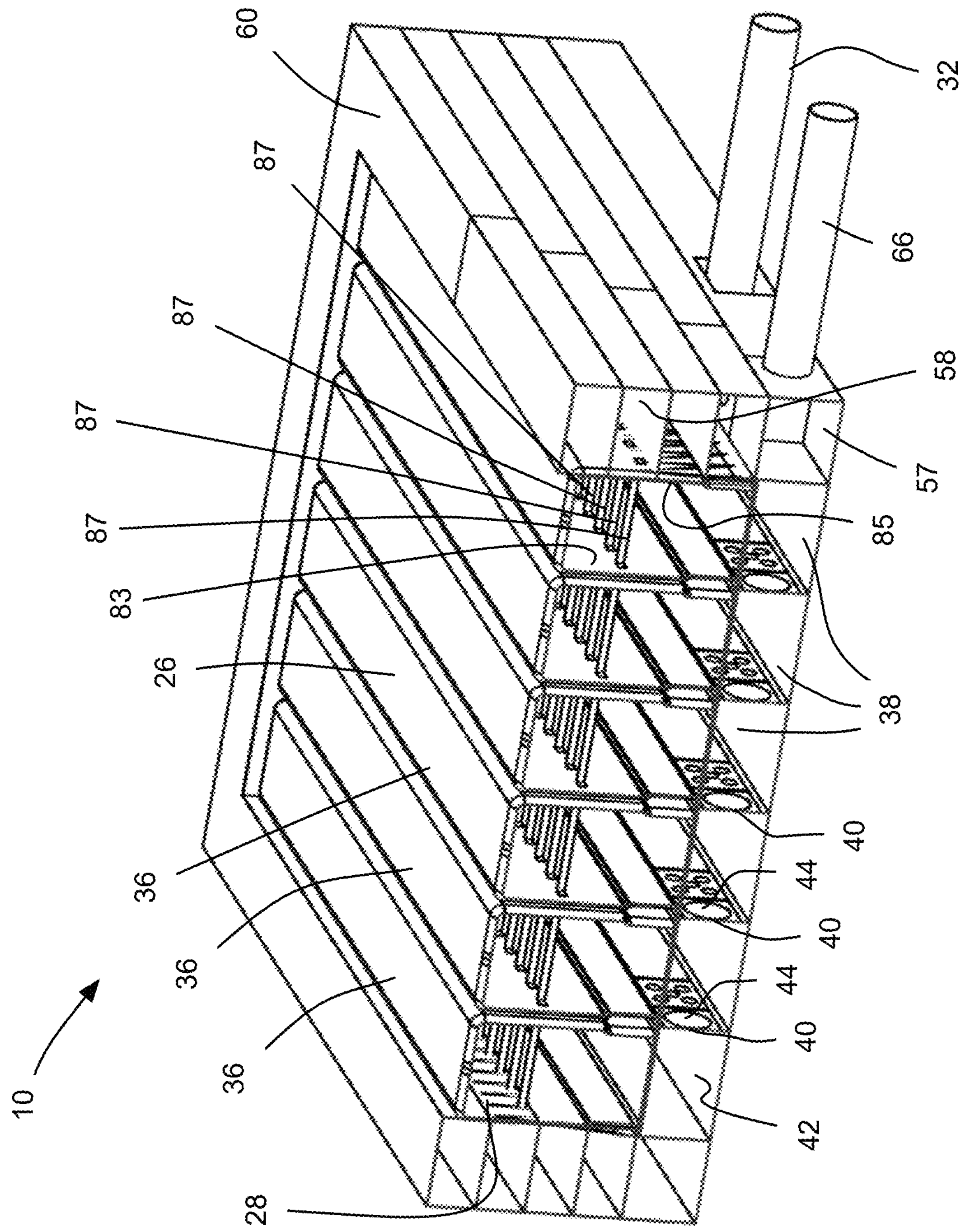
FIG. 3 is a sectional perspective view of the crash bag shown in FIG. 1 with a first bag wall removed.

FIG. 3 shows a sectional view of the crash bag 10 with the first bag wall 18 removed so as to better show the second bag wall 26. As can be seen, the second bag wall 26 is shaped so that the second bag air chamber 28 includes a plurality of projections 36 that are all fluidically connected to one another by a header region 37. A plurality of baffles 40 are shown in the header region 37 at the bottoms of the projections 36 for tethering the projections 36 to the floor of the crash bag 10, shown at 42. The baffles 40 may be made from a mesh material to permit airflow through the header region 37. Apertures through the baffles 40 are shown at 44 to further facilitate air flow.

Providing a plurality of projections 36 helps maintain a flat top to the impact structure 12. It is alternatively possible for the second bag wall 26 to be generally flat such that the second bag air chamber 28 is one large open volume. However, in order to maintain the flatness of the second bag wall 26 and in particular the upper surface of such a second bag wall, one would likely need to include many baffles or other connectors extending between various points along the second bag wall and the floor 42 so as to inhibit the second bag wall from bowing outwardly (i.e. upwardly) due to the air pressure inside the second bag air chamber.

In general, it is beneficial to inhibit bowing on the second bag wall as that would urge the user to bounce out from the crash bag upon impact therewith, or to roll off the side of the crash bag, possibly leading to injury. It is therefore advantageous to shape the crash bag to inhibit this.

Figure 9:
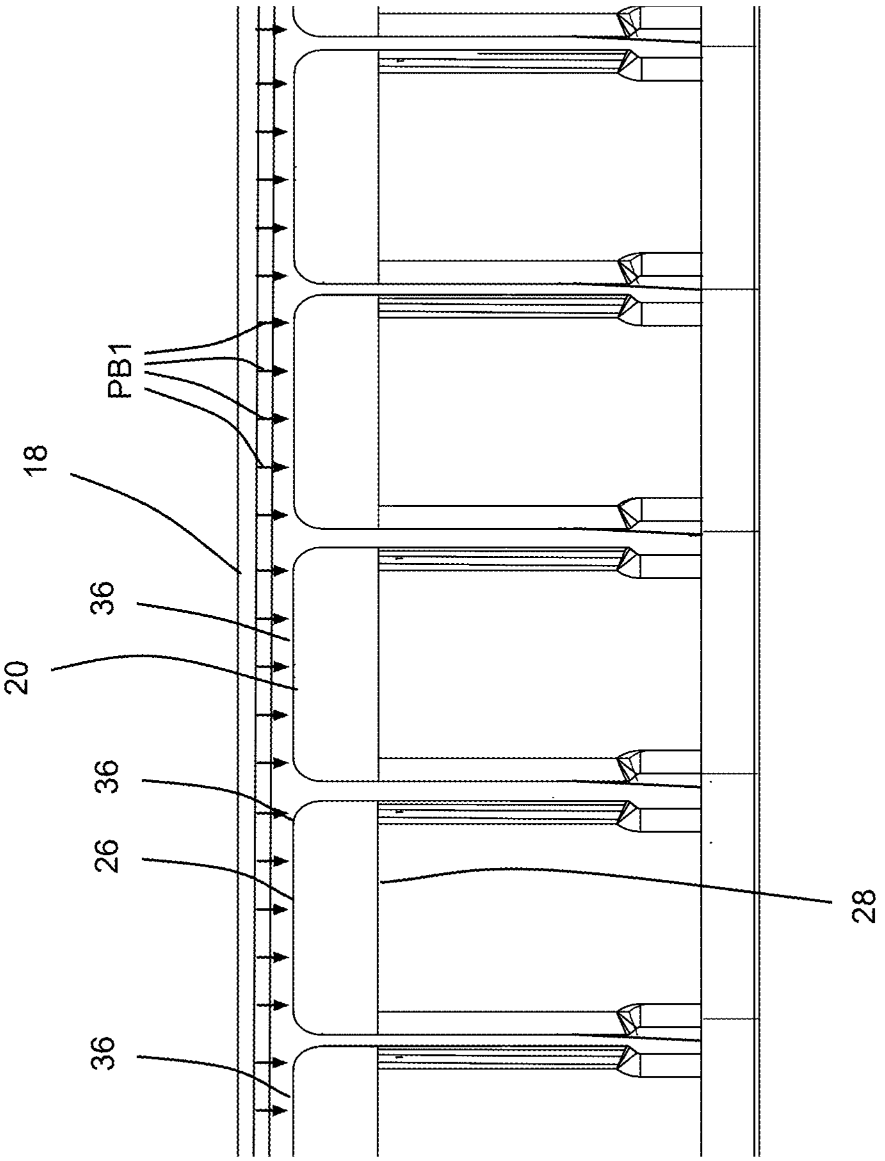
FIG. 9 is a magnified sectional elevation view of a portion of the crash bag shown in FIG. 1, in the setup state.

It is also beneficial to spread the impact force across the entirety of the second bag air chamber 28 if possible. In some prior art crash structures, a mesh cover sheet is used to hold a number of inflatable projections together. In some ways, this helps to distribute an impact force from a user across many projections. However the efficacy of this configuration at spreading the force depends on the rigidity of the cover sheet. If the cover sheet is relatively rigid, the force is better spread. If the cover sheet is less rigid, the force is not spread as much. In order to inhibit injury to the user, typically the cover sheet has little rigidity and therefore does not spread the force very effectively. In the embodiment shown in the figures, however, it is not a simple cover sheet that covers the projections 36, but is instead the first bag wall 18 which defines the first bag air chamber 20. When a user impacts the impact structure 12, the force of the user directly results in an increase in the first bag air chamber operating pressure PB1 in the first bag air chamber 20. The operating pressure PB1 is represented by a plurality of force arrows in FIG. 9. Only the forces applied to the second bag wall 26 are shown, however, it will be understood by one skilled in the art that the pressure PB1 would be applied equally to all the interior surfaces of the first bag air chamber 20. As can be seen, because the first bag air chamber 20 is filled with a fluid (i.e. air), the force of the user at impact results in a certain operating pressure PB1 in the first bag air chamber 20 which directly applies a distributed force on all the projections 36 of the second bag air chamber 28 that are exposed to it. Because this distributed force is equal on each projection 36, the impact force of the user is therefore spread substantially equally to all the projections 36. This results in a more controlled response by the crash bag 10 to the impact. By contrast, if the force were permitted to be concentrated on a single projection 36, the force would result in a larger amount of deflection within that one projection 36, which could increase the risk of injury to the user for several reasons and could increase the risk of the user bottoming out in the crash bag 10.

To help prevent each projection from laterally bowing under air pressure therein (i.e. to help keep the first and second opposing projection side walls, shown at 83 and 85 respectively of each projection 36 relatively straight (i.e. relatively planar)), a plurality of lateral tethers 87 (FIG. 3) may optionally extend between the first and second projection side walls 83 and 85 so as to connect the first and second side walls 83 and 85 together. The plurality of tethers 87 may extend laterally at a plurality of heights so as to connect the first and second side walls 83 and 85 together at various points along their respective heights. The plurality of tethers 87 may extend laterally in rows at a plurality of heights so as to connect the first and second side walls 83 and 85 together at various points along their respective lengths and heights. The lateral tethers 87 may have any suitable structure. For example, they may be made from woven nylon material, similar to the material of a vehicular seat belt. The lateral tethers 87 are preferably relatively narrow, so as to promote an even distribution of air pressure throughout the projections 36 (i.e. so as not to inhibit air flow between parts of a projection 36 and other parts of the second bag air chamber 28, since it is beneficial to have good air flow to improve the ability of the second bag air chamber 28 to dissipate the kinetic energy of an impact by the user.

The first outlet valve 14 is positioned for discharging air from the first bag air chamber 20 upon an impact on the crash bag 10 by a user. Analogously, the second outlet valve 16 is positioned for discharging air from the second bag air chamber 28 upon an impact on the crash bag 10 by a user.

Figure 7:
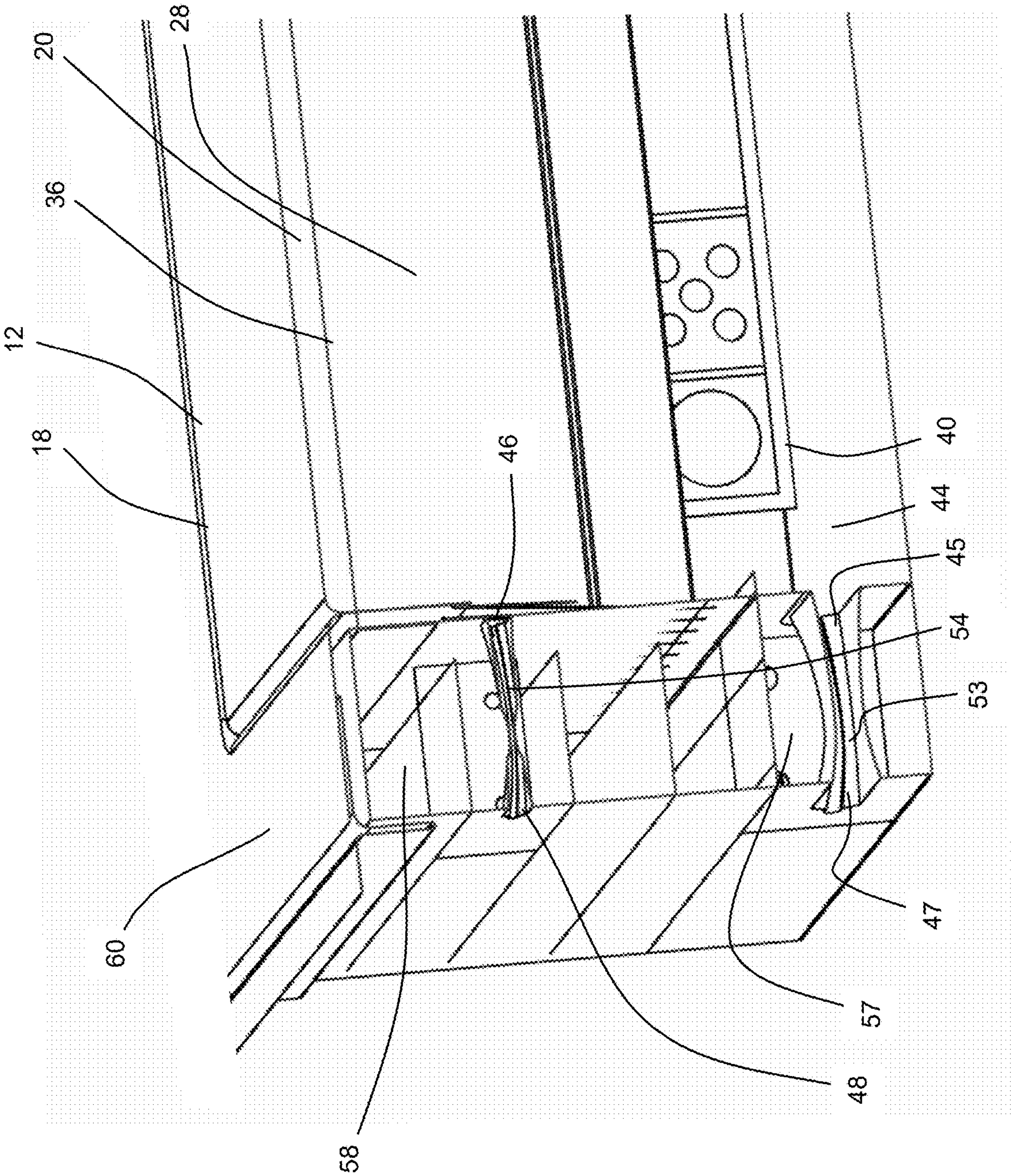
FIG. 7 is a sectional perspective view of the portion of the crash bag shown in FIG. 6B.

Optionally the first outlet valve 14 may have a structure as shown in FIGS. 7 and 8. In that example, the first outlet valve 14 has a first valve inlet 46 that is in fluid communication with the first bag air chamber 20 and a first valve outlet 48 that discharges air towards the exterior of the crash bag 10. The first outlet valve 14 has a first peripheral valve wall 50 that is flexible, and that has an inner face 52 that defines a first valve passage 54 through the first outlet valve 14 between the first valve inlet 46 and the first valve outlet 48. The first peripheral valve wall 50 further has an outer face 56 that is in a first valve air chamber 58 having a first valve air chamber operating pressure PV1.

Figure 6A:
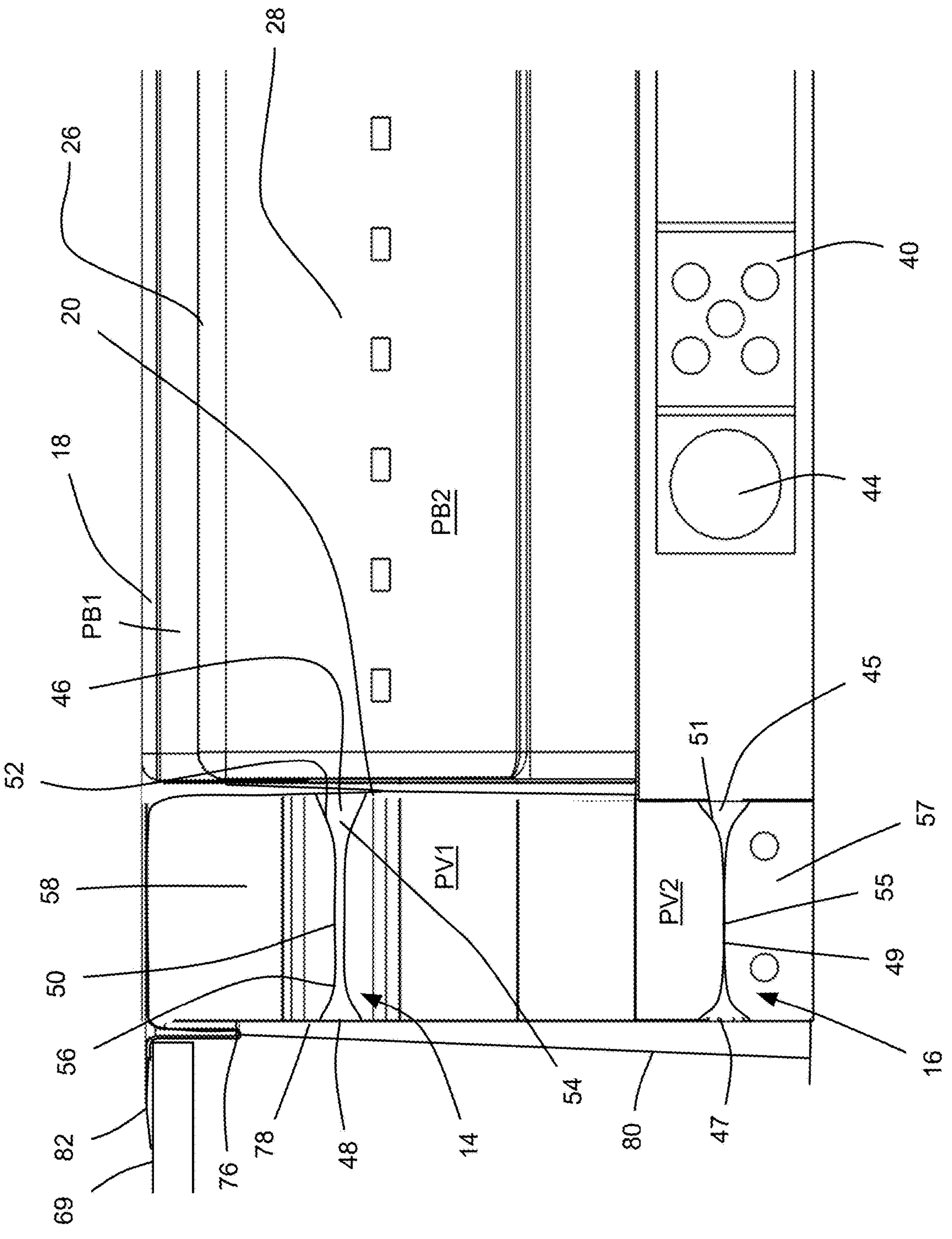
FIG. 6A is a magnified cross-sectional view of a portion of the crash bag shown in FIG. 1, in a setup state.
Figure 6B:
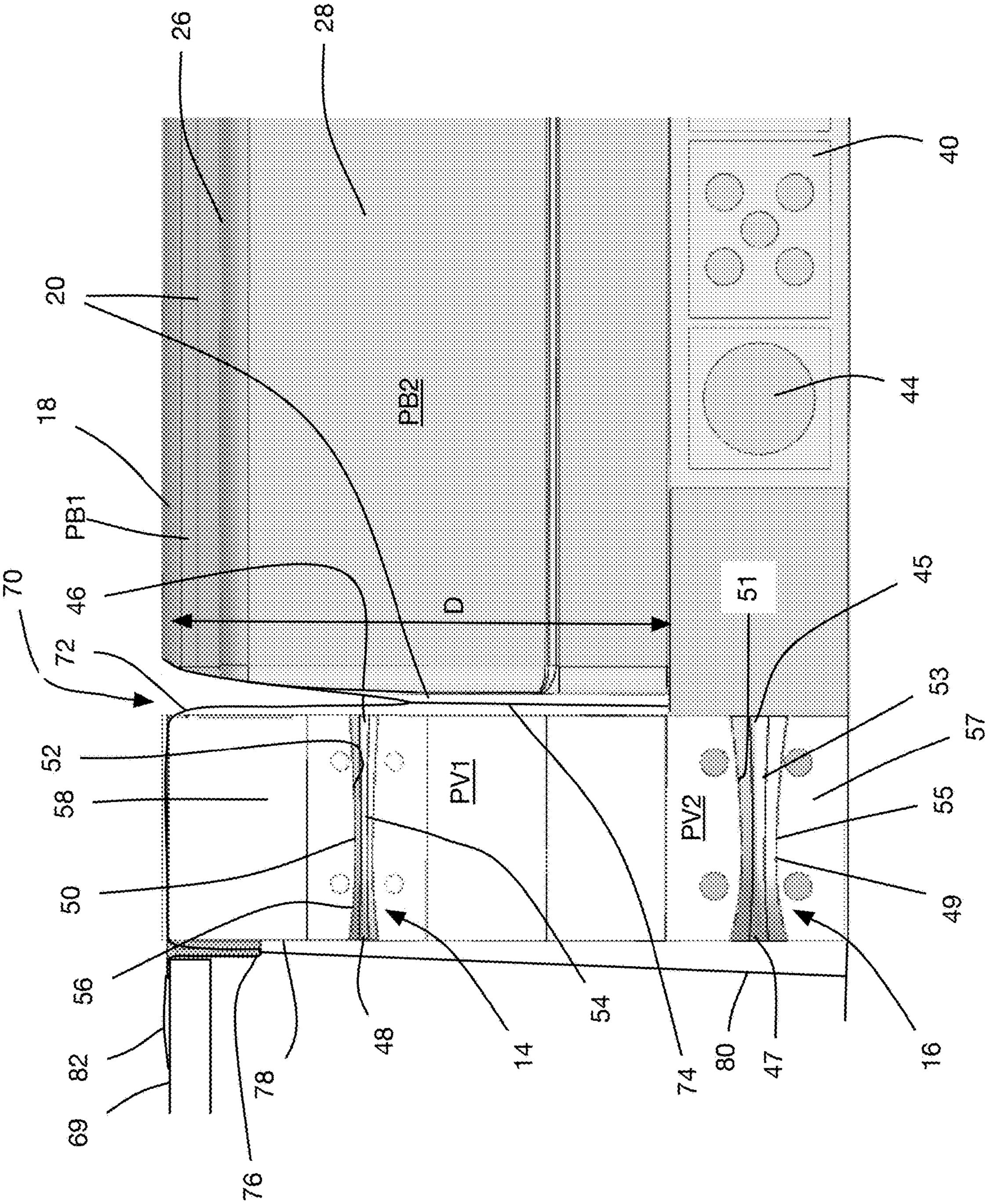
FIG. 6B is a magnified cross-sectional view of a portion of the crash bag shown in FIG. 1, upon impact by the user having the second kinetic energy.
Figure 8A:
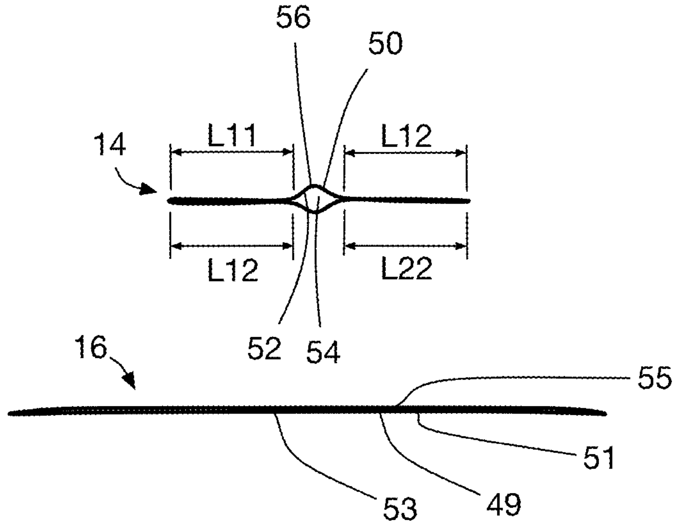
FIG. 8A is a sectional view at a central portion of a passage through a first outlet valve and a second outlet valve from the crash bag shown in FIG. 1, in the setup state.

Referring to FIGS. 2A, 6A and 8A, when the crash bag 10 is in a setup state, the crash bag 10 is ready to receive an impact. In the setup state, the first valve air chamber operating pressure PV1 is greater than the first bag air chamber operating pressure PB1 so as to drive a first length L1 of the inner face 52 of the first peripheral valve wall 50 (wherein in the present example L1 is made up of portions L11 and L12 shown in FIG. 8A) into engagement with a second length L2 of the inner face 52 of the first peripheral valve wall 50 (wherein in the present example L2 is made up of corresponding portions L21 and L22 shown in FIG. 8A) so as to inhibit air leakage out of the first bag air chamber 20 from the first outlet valve 14. For greater certainty, it will be noted that the first outlet valve 14 need not be completely closed when the crash bag 10 is in the setup state. Some air leakage out of the first bag air chamber 20 may therefore occur when the first outlet valve 14 is in the setup state. In the present example, the first outlet valve 14 includes a setup state leakage region 61 that is configured to remain open while the rest of the first outlet valve 14 is closed when in the setup state, as shown in FIG. 8A. The leakage region 61 is sized to provide enough air leakage flow out of the first bag air chamber 20 to inhibit the first bag wall 18 from becoming domed (i.e. crowning) under the pressure PB1 of the air in the first bag air chamber 20.

Figure 8B:
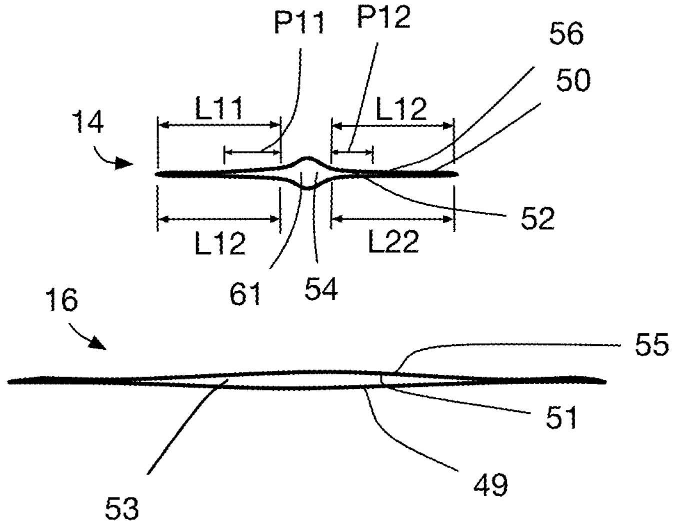
FIG. 8B is a sectional view of the first and second outlet valves from the crash bag shown in FIG. 8A, upon impact by the user having the first kinetic energy.

When the crash bag 10 is in the setup state, an impact by a user 11 having a first kinetic energy on the impact structure 12 (as shown in FIGS. 2B and 8B) increases the first bag air chamber operating pressure PB1 sufficiently to drive a first portion P1 of the first length L1 of the inner face 52 of the first peripheral valve wall 50 (wherein the first portion P1 is made up of two first subportions P11 and P12 shown in FIG. 8B) away from the second length L2 of the inner face 52 of the first peripheral valve wall 50 so as to facilitate air leakage through the first valve passage 54. In FIG. 8B, as in FIG. 8A, the first length L1 is shown in constituent portions L11 and L12, and the second length L2 is shown in constituent portions L21 and L22.

Figure 8C:
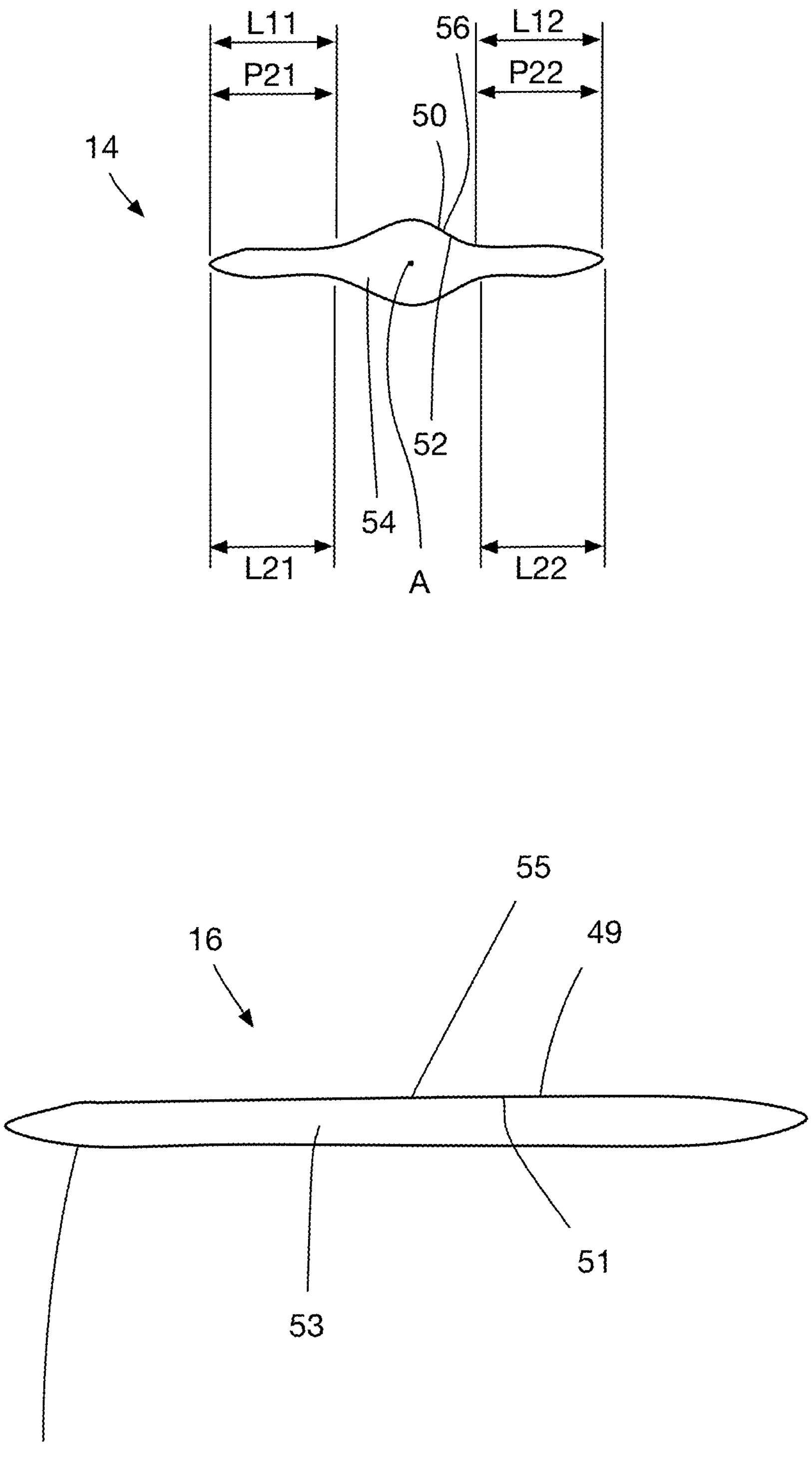
FIG. 8C is a sectional view of the first and second outlet valves from the crash bag shown in FIG. 8A, upon impact by the user having the second kinetic energy.

When the crash bag 10 is in the setup state, an impact by the user 11 having a second kinetic energy on the impact structure 12 that is higher than the first kinetic energy (as shown in FIGS. 20, 60, 7, and 8C), increases the first bag air chamber operating pressure PB1 sufficiently to drive a second portion P2 of the first length L1 of the inner face 52 of the first peripheral valve wall 50 away from the second length L2 of the inner face 52 of the first peripheral valve wall 50 so as to facilitate air leakage through the first valve passage 54. The second portion P2 of the first length L1 is greater than the first portion P1 of the first length L1. As shown in FIG. 8C in particular, the second portion P2 (which is made up of two second subportions P21 and P22 shown in FIG. 8C). is the entirety of the first length L1. In other words, the first and second lengths L1 and L2 are entirely separated from one another. In FIG. 8C, as in FIG. 8A, the first length L1 is shown in constituent portions L11 and L12, and the second length L2 is shown in constituent portions L21 and L22.

The entirety of the first peripheral valve wall 50 may be flexible so that both the first and second lengths L1 and L2 of the first peripheral valve wall 50 are moved towards and away from one another depending on the first bag air chamber operating pressure PB1 in relation to the first valve air chamber operating pressure PV1. Alternatively, the first outlet valve 14 may be configured so that only some fraction of the first peripheral valve wall 50 is flexible such as a single panel on the top or bottom.

Figure 10:
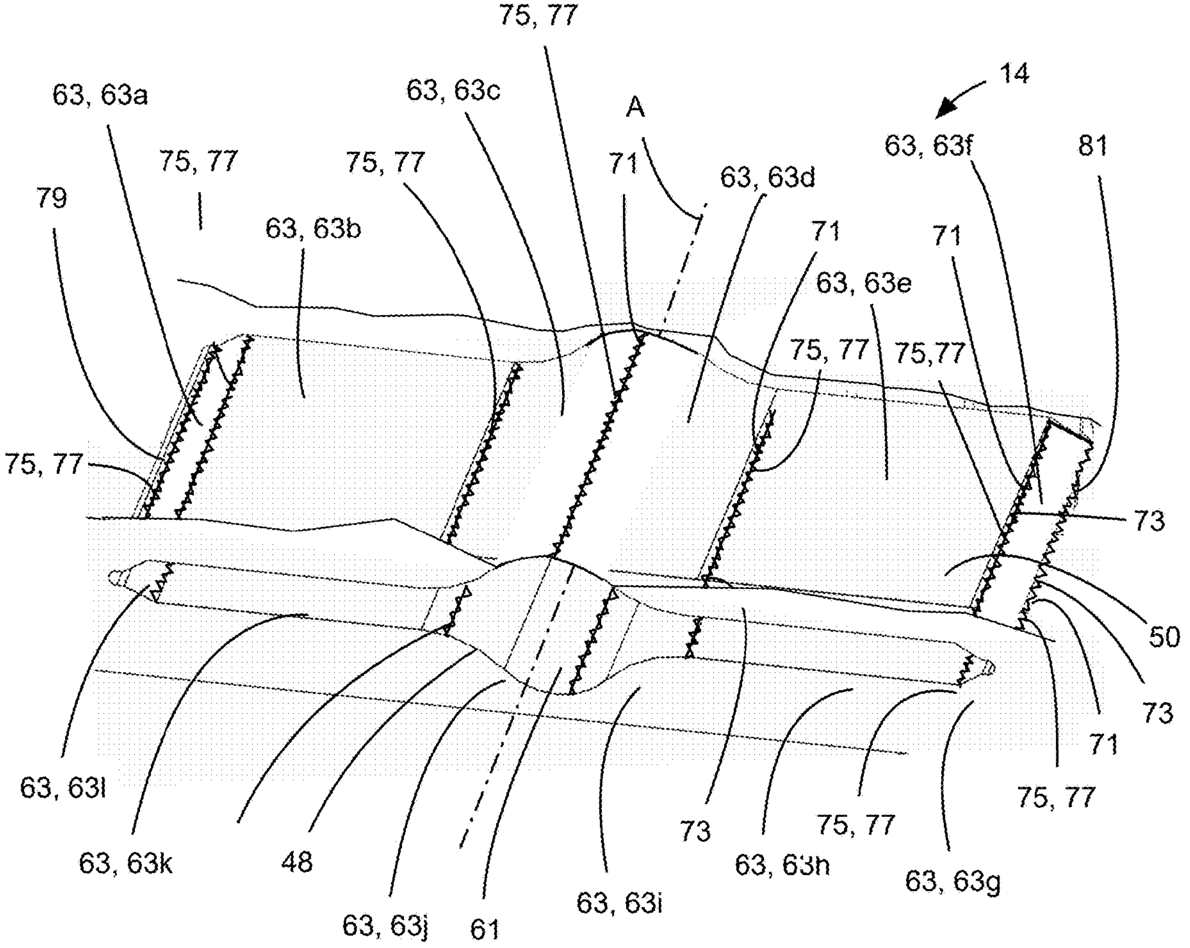
FIG. 10 is a magnified perspective view of the first outlet valve shown in FIG. 1.

Reference is made to FIG. 10 which shows the first outlet valve 14 is isolation. In the embodiment shown, the first outlet valve 14 has a first outlet valve axis A extending between the first valve inlet 46 and the first valve outlet 48. The first peripheral valve wall 50 includes a plurality of first peripheral valve wall panels 63, some of which are shown individually at 63*a*, 63*b*, 63*c*, 63*d*, 63*e*, 63*f*, 63*g*, 63*h*, 63*i*, 63*j*, 63*k* and 63*l*. Each first peripheral valve wall panel 63 has a first side edge 71 and a second side edge 73 both of which extend generally axially. The first side edge 71 from each of the plurality of first peripheral valve wall panels 63 is joined to a second side edge 73 of an adjacent one of the first peripheral valve wall panels 63 by a seam 75. The term 'generally axially' is intended to mean that the first and second side edges 71 and 73 extend at least some amount in the axial direction.

At least one of the seams 75 is a slope-change seam 77 such that a slope of the first peripheral valve wall 50 in a transverse plane (i.e. plane that is orthogonal to the axis A) changes by more at said at least slope-change seam 77 than along a portion of the first peripheral valve wall 50 extending between the slope-change seam 77 and a subsequent one of the seams 75. In some embodiments, such as that shown in the figures, the first outlet valve 14 has a first lateral edge 79 and a second lateral edge 81. A first one of the at least one slope-change seam 77 is at the first lateral edge 79 of the first outlet valve 14 and a second one of the at least one slope-change seam 77 is at the second lateral edge 81 of the first outlet valve 14. In the embodiment shown each of the seams 75 is one of the at least one slope-change seam 77. In other words, in the embodiment shown, all of the seams 75 are slope-change seams 77.

Optionally, the second outlet valve 16 may operate the same way as the first outlet valve 14 and may thus have a first valve inlet 45 that is in fluid communication with the second bag air chamber 28 and the first valve outlet 48 that discharges air towards the exterior of the crash bag 10. The second outlet valve 16 has a second peripheral valve wall 49 that is flexible, and which may be similar to the first peripheral valve wall 50, and that has an inner face 51 that defines a second valve passage 53 through the second outlet valve 14 between the second valve inlet 45 and the second valve outlet 47. The second peripheral valve wall 49 further has an outer face 55 that is in a second valve air chamber 57 having a first valve air chamber operating pressure PV2. In the embodiment shown, the second valve air chamber 57 is in fluid communication with the first valve air chamber 58 and the two air chambers 57 and 58 could be considered to be part of one large air chamber.

As a result, the first outlet valves 14 and 16 both automatically open to a greater or lesser extent based on the kinetic energy of the impact by the user. Thus, there is no need for a bag operator to manually adjust a valve outlet based on a guess as to the kinetic energy of the impact that is about to occur.

Because the force of impact is applied to both the first and second bag air chambers 20 and 28 (due to the increase in pressure in the first bag air chamber 20 upon impact, which results in a distributed force on the second bag wall 26 which defines the second bag air chamber 28), the impact by the user will result in both the first and second outlet valves 14 and 16 reacting by opening more (e.g. FIGS. 2B and 8B, or 2C, 6B and 10C) than when the crash bag 10 is in a setup state (FIGS. 2A, 6A and 8A).

Figure 4:
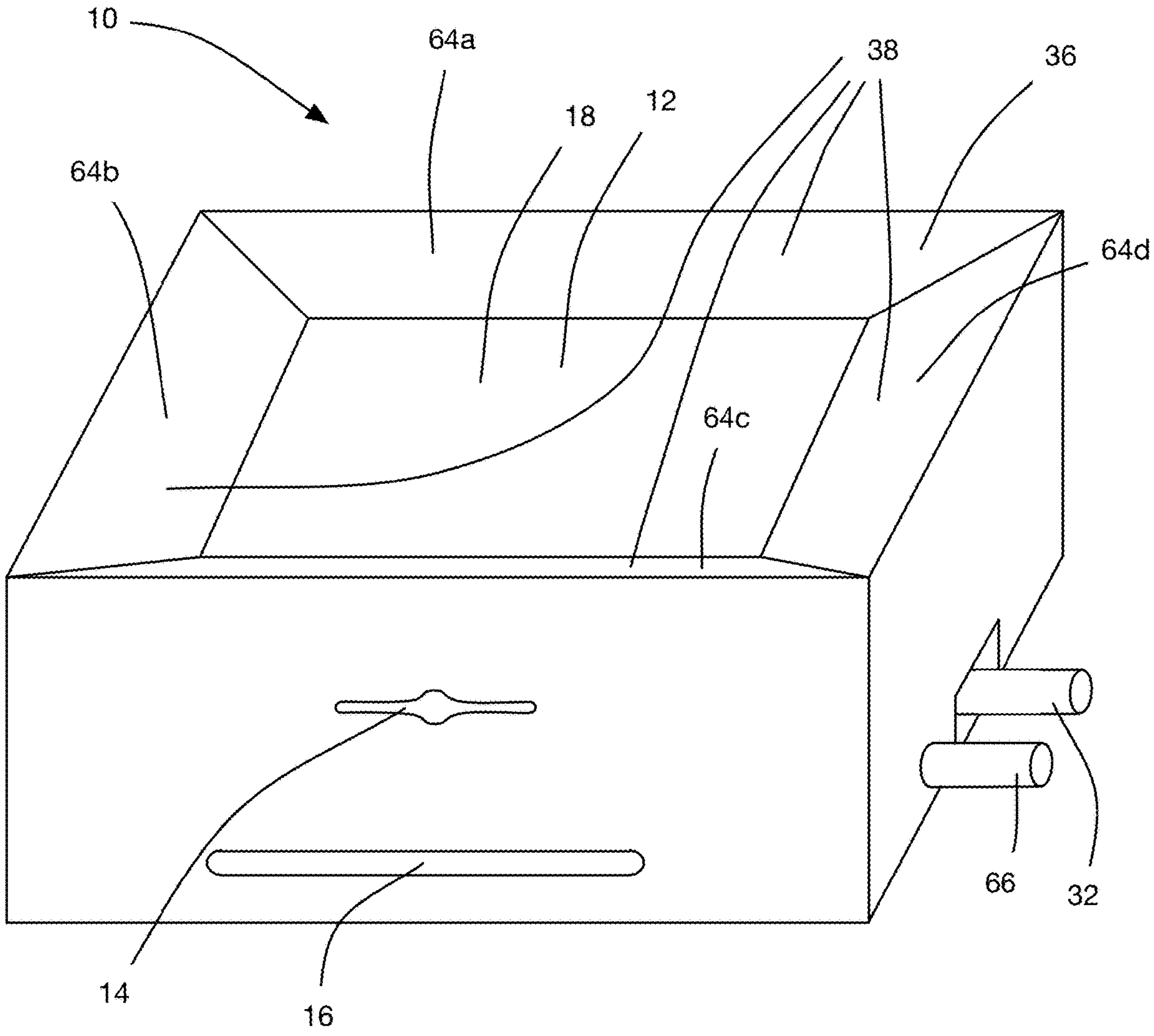
FIG. 4 is a perspective view of a variant of the crash bag shown in FIG. 1.
Figure 5:
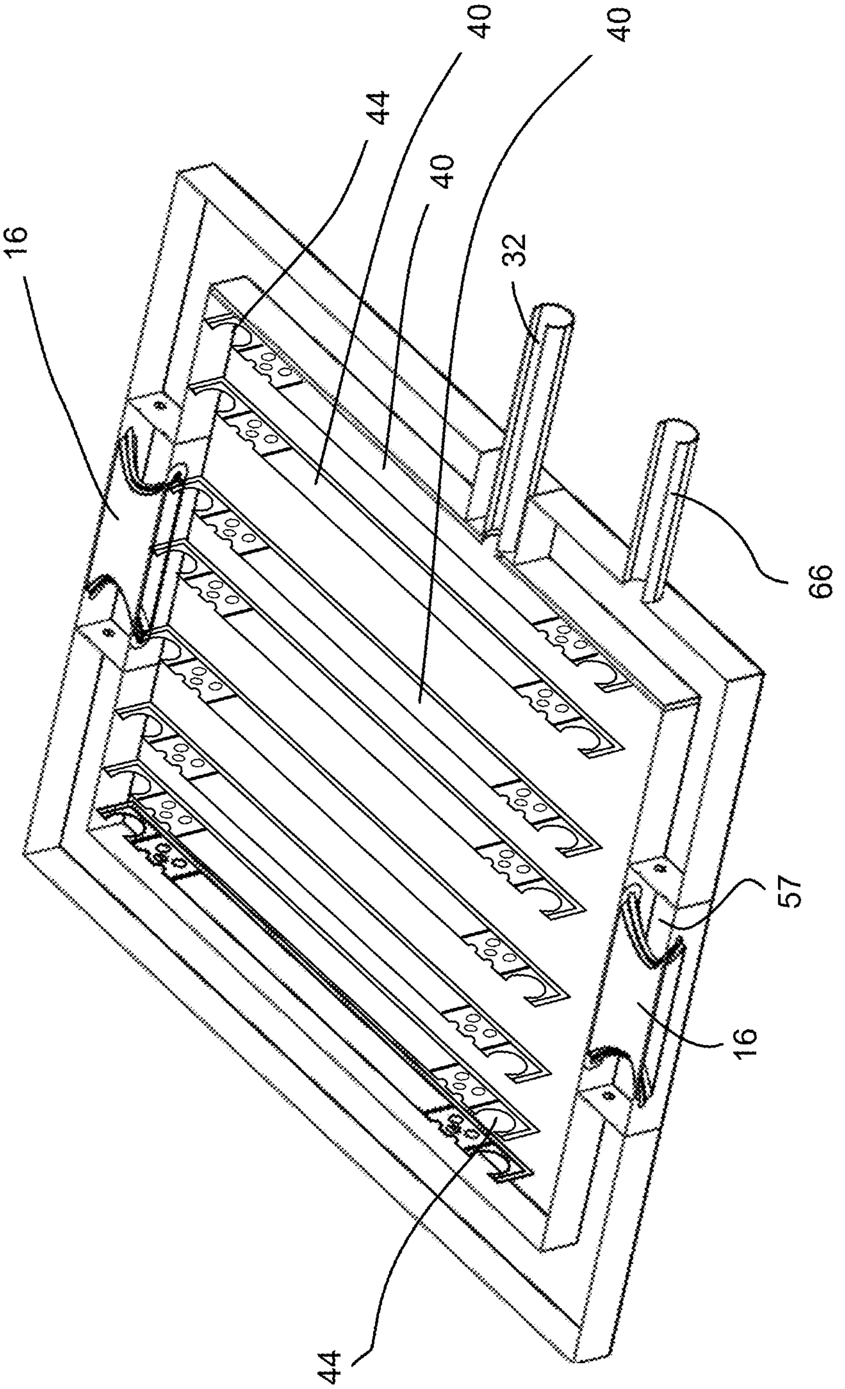
FIG. 5 is sectional perspective view showing a bottom-most portion of the crash bag shown in FIG. 1.

The crash bag 10 further includes a safety surround 60 that surrounds at least a portion of the impact structure 12. The safety surround 60 is itself inflatable, and optionally has an upper surface 62 that is sloped inwardly towards the impact structure 12 (as shown in the alternative configuration shown in FIG. 4), so that, in the event that a user is off-target and hits the safety surround 60, the impact with the safety surround 60 will tend to urge the user towards the impact structure 12. The individual faces, shown at 64*a*, 64*b*, 64*c* and 64*d* that make up the upper surface 38 in the example embodiment shown, are shown as being planar, however, it will be understood that they could alternatively be curved to some degree as a result of being inflated flexible panels. The individual faces 64*a*, 64*b*, 64*c* and 64*d* may have any suitable slope angle, such as a slope angle of about 35 degrees relative to horizontal during use.

In the example shown, the first valve air chamber 58 is inside the safety surround 60 and has a first valve air chamber inlet 66 for receiving pressurized air. In the example shown the first valve air chamber inlet 66 is connectable to a second pressurized air source 68 that is separate from the first pressurized air source 32. By providing a separate pressurized air source for the first valve air chamber 58, it is easier to provide a selected difference between the pressure in the first valve air chamber 58 and the first and second bag air chambers 20 and 28. Additionally, providing a second pressurized air source 68 permits the first valve air chamber 58 to be kept entirely separate fluidically from the first and second bag air chambers 20 and 28, and as a result, the impact of a user on the impact structure 12 will have little effect on the pressure in the first valve air chamber 58. Additionally, it will be noted that both the first valve air chamber 58 and the safety surround 60 are advantageously kept at a generally constant pressure, and do not contain a valve that releases air to the atmosphere when a user applies a force on them. For example, during use, the user will move off of the impact structure 12 and climb onto the safety surround 60 in order to get off the crash bag 10. The safety surround 60 may be at the same level as a platform (shown at 69 in FIGS. 6A and 6B) intended for the user to use when leaving the crash bag 10. As a result, it is preferable for the safety surround 60 to not lose pressure when the user puts their weight on it.

Additionally, in order for the safety surround 60 to remain at the level of the adjacent platform 69 after an impact, the safety surround 60 preferably is laterally separable from an uppermost portion 67 of the impact structure 12. The uppermost portion 67 of the impact structure 12 is that portion of the impact structure 12 that collapses inwardly towards a load F applied by the user after impact. The load F applied by the user is the force applied as a result of the weight of the user and the speed of the user immediately prior to impact. By contrast, if the safety surround 60 were fixedly joined with the uppermost portion 67 of the impact structure 12, then the load F applied by the user cause the safety surround 60 to collapse laterally inwardly along with the uppermost portion of the impact structure 12 upon impact by the user. Such inward collapse by the safety surround 60 would make it difficult for the user to climb off the impact structure 12 onto the safety surround 60 and from there to get off the crash bag 10. In order to make the safety surround 60 be laterally separable from the uppermost portion 67 of the impact structure 12, a crevice 70 may be provided between the safety surround 60 and the uppermost portion 67 of the impact structure 12 and has a depth D. In the present example, the depth D may be about 5 feet.

It would be advantageous to prevent a user from falling into the crevice 70 since it would be difficult to climb out of a crevice of such a depth. For shorter people and children in particular falling into a deep crevice could be injurious to them. In order to prevent such an occurrence the crevice 70 may be covered by an apron 72. The apron 72 need only extend down by half of the depth D of the crevice 70 in order to permit the impact structure 12 to collapse to the entire depth of the crevice 70. By providing the apron 72 the effective depth of the crevice 70 is cut essentially in half, thereby rendering the crevice less of a risk and less difficult to climb out of by a user in the event that they fall in. While in some embodiments it is optimal for the apron 72 to extend approximately 50% of the depth of the crevice 70, it is possible for the apron to extend to a different portion of the depth of the crevice 70. For example, the apron 72 may extend as much as 70% of the depth of the crevice 70. This permits the impact structure 12 to collapse by more than the depth D of the crevice 70, while still providing some advantage to a user if they fall into the crevice 70. In some embodiments, the apron 72 may extend as little as 30% of the depth of the crevice 70. In still other embodiments, the apron 72 may extend between about 55% and about 45% of the depth of the crevice 70. In still other embodiments, the apron 72 may extend about 50% of the depth of the crevice 70.

In the embodiment shown, the apron 72 is tethered by tethers 74 to any suitable point in the crevice 70. For example, the tethers 74 may extend between the bottom of the crevice 70 and the bottom of the apron 72 when hanging down in the crevice 70 while the crash bag 10 is in the setup state.

In the present embodiment, the apron 72 is a peripheral extension of the first bag wall 18. As a result, the crevice 70 forms part of the first bag air chamber 20, and the apron 72 partially defines that part of the first bag air chamber 20. The apron 72 extends up and over the safety surround 60, such that its outer edge 76 hangs over outer face shown at 78 of the safety surround 60. To inhibit leakage of air out from the first bag air chamber 20 through the space between the apron 72 and the upper surface 38 of the safety surround 60, the apron 72 may be affixed to the safety surround 60 via a sealing member 95, such as, for example, an industrial grade hook-and-loop fastener as shown. Additionally, optionally, the outer portion 76 of the apron 72 could be tethered to the bottom of the crash bag 10, or could be tethered to any other suitable point such as a suitable point on the ground proximate the crash bag 10, in order to generate a selected amount of sealing between the apron 72 and the safety surround 60. A tether for this purpose is shown at 80 in FIG. 7. In a further embodiment, the apron 72 may extend across to the aforementioned platform 69 adjacent the crash bag 10 so as to prevent a person from falling in the space between the crash bag 10 and the platform 69. In the further embodiment, the apron 72 may be tethered to a point on the platform 69. A tether for this purpose is shown at 82.

Figure 11:
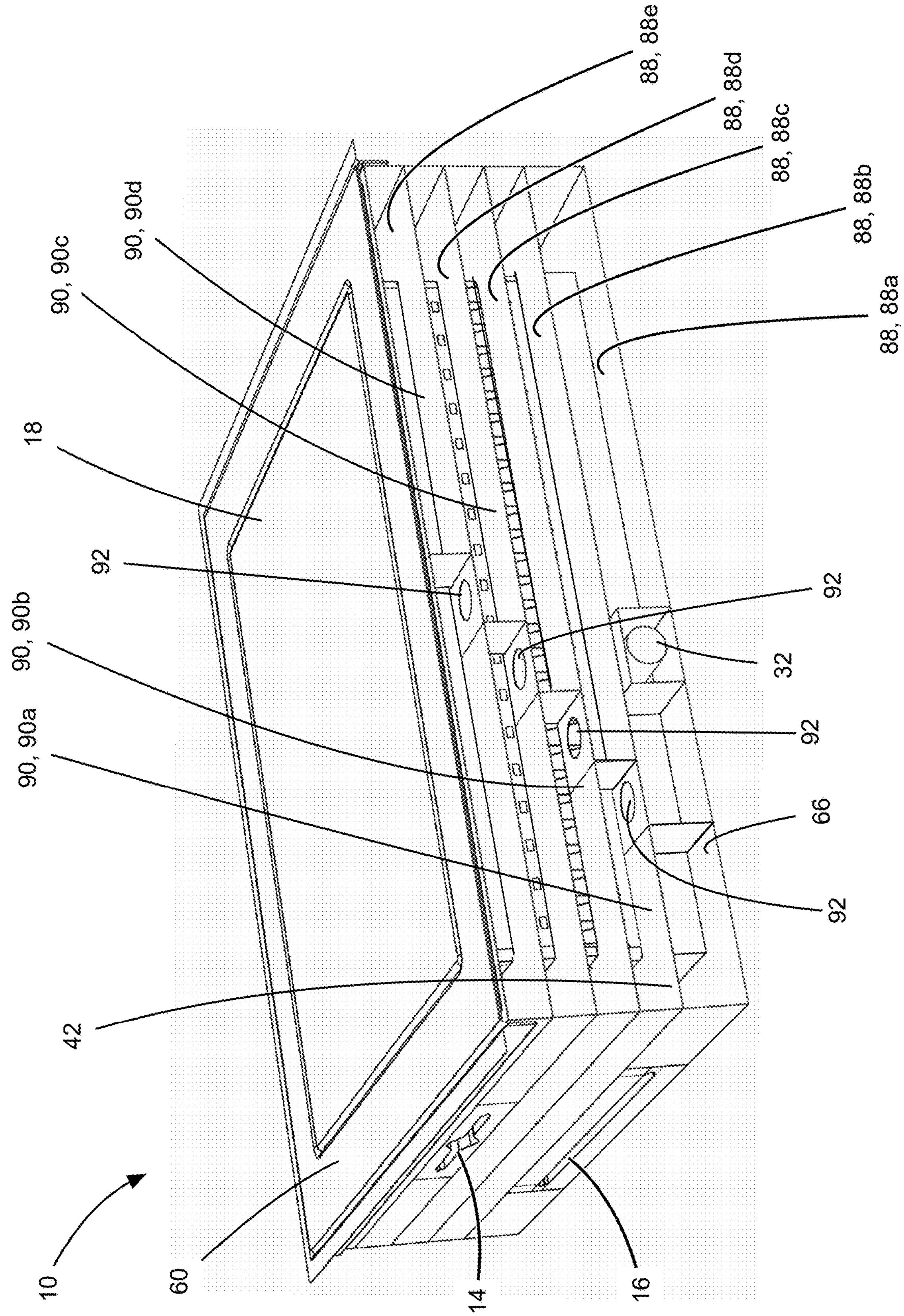
FIG. 11 is a sectional perspective view of one side of the crash bag shown in FIG. 1.

Reference is made to FIG. 11, which illustrates another aspect of the present disclosure that is provided in the safety surround 60. FIG. 11 is a perspective view of one side of the crash bag 10. As can be seen, the impact structure 12 is present in FIG. 11 and includes at least a first bag air chamber (e.g. the first bag air chamber 20), which has the first bag air chamber inlet 34, and which has the first bag air chamber operating pressure PB1. There is provided the first outlet valve 14 positioned for discharging air from the first bag air chamber 20 upon an impact on the impact structure 12 by a user. There is provided a safety peripheral structure, which has a second bag air chamber (which may be the second bag air chamber 28 as shown in the other figures, or which may be a second bag air chamber that, for example, is provided solely in the safety peripheral structure). In either case, the second bag air chamber has a second bag air chamber inlet (e.g. inlet 32) for receiving pressurized air and has a second bag air chamber operating pressure PB2. There is provided a second outlet valve (e.g. the second outlet valve 16) positioned for discharging air from the second bag air chamber 28 upon an impact thereon by the user. The safety peripheral structure extends along a periphery of the first bag air chamber. Optionally, the safety peripheral structure may extend all the way around the periphery of the first bag air chamber (and may be referred to as a safety surround. In some embodiments, however, it is contemplated that the safety peripheral structure may extend only along a portion of the periphery, to facilitate climbing out of the crash bag 10 onto a platform after impacting the impact structure 12. The second bag air chamber 28 is divided into a plurality of subchambers shown generally at 88 and shown individually at 88*a*, 88*b*, 88*c*, 88*d* and 88*e*, that are separated from one another by a plurality of dividers shown generally at 90, and shown individually at 90*a*, 90*b*, 90*c* and 90*d*.

Each of the plurality of dividers 90 has a pass-through aperture 92. The pass-through aperture 92 on a first divider 90*a* from the plurality of dividers 90 is spaced sufficiently to be free of any overlap with the pass-through aperture 92 on a second divider 90*b* from the plurality of dividers that is subsequent to the first divider 90*a*. The pass-through aperture 92 on the second divider 90*b* is spaced sufficiently to be free of any overlap with the pass-through aperture 92 on a third divider 90*c*, which is subsequent to the second divider 90*b*. In the embodiment shown, the pass-through aperture 92 on the third divider 90*c* is spaced sufficiently to be free of any overlap with the pass-through aperture 92 on a fourth divider 90*d* from the plurality of dividers 90, which is subsequent to the third divider 90*c*. This provides an airflow path that is somewhat more tortuous than if the pass-through apertures 92 overlapped, thereby making it even harder for air to escape from the subchambers 88, which in turn makes the safety peripheral structure better able to support the weight of a user while the user climbs up thereon from the impact structure 12 and gets off the crash bag 10 onto an adjacent platform.

In the particular embodiment, it is particularly difficult for air to escape from the subchambers 88 because of the configuration of the dividers 90 and pass-through apertures 92. To this end, each of the subchambers 88 has a first end 93 and a second end 94. As can be seen, the second bag air chamber inlet 66 is proximate the first end 93 of the first peripheral subchamber 88*a* and the pass-through aperture 92 on the first divider 90*a* is proximate the second end 94 of the first peripheral subchamber 88*a* and the first end 93 of the second peripheral subchamber 88*b*. The pass-through aperture 92 on the second divider 90*b* is proximate the second end 94 of the second peripheral subchamber 88*b* and the first end 93 of the third peripheral subchamber 88*c*. The pass-through aperture 92 on the third divider 90*c* is proximate the second end 94 of the third peripheral subchamber 88*c* and the first end 93 of the fourth peripheral subchamber 88*d*. Finally, in the present example, the pass-through aperture 92 on the fourth divider 90*d* is proximate the second end 94 of the fourth peripheral subchamber 88*d* and the first end 93 of the fifth peripheral subchamber 88*e*. The second end 94 of the fifth peripheral subchamber 88*e* is blind.

It will be understood that the crash bag 10 need not specifically have four dividers 90, forming five subchambers 88. It is alternatively possible for the crash bag 10 to include more or fewer dividers 90 and therefore, more or fewer subchambers 88.

Providing the dividers and pass-through apertures in any of the ways described above provides an airflow path that is relatively tortuous, thereby making it even harder for air to escape from the subchambers 88, which in turn makes the safety peripheral structure even better able to support the weight of a user while the user climbs up thereon from the impact structure 12 and gets off the crash bag 10 onto an adjacent platform, even though the plurality of walls forming the safety support structure (and the walls forming the rest of the crash bag) are made from flexible material such as PVC sheet or nylon sheet.

In the embodiment shown, there are two first outlet valves 14 at opposing ends of the impact structure 12 and two second outlet valves 16 at opposing ends of the impact structure 12. It is alternatively possible however for there to be only one first outlet valve 14 and one second outlet valve 16.

The crash bag 10 as shown and described is capable of dissipating high impact energies in a predictable way while reducing the likelihood of injury to the user as compared to other systems. Furthermore, the crash bag 10 is capable of effectively dissipating a wide range of kinetic energies of impact without injury to users, without requiring significant adjustment (or any adjustment).

While the embodiment shown in the figures includes a first outlet valve 14 and the second outlet valve 16, it will be noted that a crash bag that included only a single bag air chamber that includes a single outlet valve similar to the outlet valve 14, for example, is contemplated to be inventive.

While the embodiment shown in the figures provides an outlet valve (i.e. outlet valve 14) for the first bag air chamber 20, it is alternatively possible to provide no outlet valve for the first bag air chamber 20, while still providing the outlet valve 16 for the second bag air chamber 28.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A first outlet valve for a crash bag, comprising:

a first peripheral valve wall defining a first valve inlet and a first valve outlet, and wherein the first peripheral valve wall is flexible and has an inner face that defines a passage through the first outlet valve between the first valve inlet and the first valve outlet, wherein the first peripheral valve wall has an outer face that is in a first valve air chamber having a first valve air chamber operating pressure, wherein the first outlet valve has a first outlet valve axis extending between the first valve inlet and the first valve outlet, and wherein the first peripheral valve wall includes a plurality of first peripheral valve wall panels each having a first side edge and a second side edge both of which extend generally axially, wherein the first outlet valve includes a plurality of seams, wherein the first side edge from each of the plurality of first peripheral valve wall panels is joined to the second side edge of an adjacent one of the first peripheral valve wall panels by a seam from the plurality of seams, wherein at least one of the plurality of seams is at least one slope-change seam, wherein the first outlet valve has a transverse plane that is orthogonal to the first outlet valve axis, and wherein the first peripheral valve wall has a slope in the transverse plane, wherein the slope changes by more at the at least one slope-change seam than the slope changes along a portion of the first peripheral valve wall extending between the at least one slope-change seam and a subsequent one of the plurality of seams.

2. The first outlet valve as claimed in claim 1, wherein the at least one slope-change seam is a plurality of slope-change seams, wherein the first outlet valve has a first lateral edge and a second lateral edge and wherein a first one of the plurality of slope-change seams is at the first lateral edge of the first outlet valve and a second one of the plurality of slope-change seams is at the second lateral edge of the first outlet valve.

3. The first outlet valve as claimed in claim 1, wherein the at least one slope-change seam is a plurality of slope-change seams.

4. A crash bag, comprising:

an impact structure having a first bag wall at least partially defining a first bag air chamber that has a first bag air chamber inlet for receiving pressurized air, and a first bag air chamber operating pressure; and a first outlet valve that includes a first peripheral valve wall defining a first valve inlet that is in fluid communication with the first bag air chamber, and wherein the first peripheral valve wall further defines a first valve outlet, and wherein the first peripheral valve wall is flexible and has an inner face that defines a passage through the first outlet valve between the first valve inlet and the first valve outlet, wherein the first peripheral valve wall has an outer face that is in a first valve air chamber having a first valve air chamber operating pressure, wherein the first outlet valve has a first outlet valve axis extending between the first valve inlet and the first valve outlet, and wherein the first peripheral valve wall includes a plurality of first peripheral valve wall panels each having a first side edge and a second side edge both of which extend generally axially, wherein the first outlet valve includes a plurality of seams, wherein the first side edge from each of the plurality of first peripheral valve wall panels is joined to the second side edge of an adjacent one of the first peripheral valve wall panels by a seam from the plurality of seams, wherein at least one of the plurality of seams is at least one slope-change seam, wherein the first outlet valve has a transverse plane that is orthogonal to the first outlet valve axis, and wherein the first peripheral valve wall has a slope in the transverse plane, wherein the slope changes by more at the at least one slope-change seam than the slope changes along a portion of the first peripheral valve wall extending between the at least one slope-change seam and a subsequent one of the plurality of seams.

5. The crash bag as claimed in claim 4, wherein the at least one slope-change seam is a plurality of slope-change seams, wherein the first outlet valve has a first lateral edge and a second lateral edge and wherein a first one of the plurality of slope-change seams is at the first lateral edge of the first outlet valve and a second one of the plurality of slope-change seams is at the second lateral edge of the first outlet valve.

6. The crash bag as claimed in claim 4, wherein the at least one slope-change seam is a plurality of slope-change seams.

* * * * *